(12) United States Patent
Wu (10) Patent No.: US 12,364,247 B1
(45) Date of Patent: Jul. 22, 2025

(54) PET PAD

(71) Applicant: ABSORB FORTUNE LIMITED, Hong Kong (CN)

(72) Inventor: Yaguang Wu, Bengbu (CN)

(73) Assignee: ABSORB FORTUNE LIMITED, Hong Kong (CN)

( * ) Notice: Subject to any disclaimer, the term of this patent is extended or adjusted under 35 U.S.C. 154(b) by 0 days.

(21) Appl. No.: 18/894,319

(22) Filed: Sep. 24, 2024

(30) Foreign Application Priority Data

Jun. 21, 2024 (CN) .......................... 202421444022.2

(51) Int. Cl.
*A01K 1/035* (2006.01)
*B32B 3/30* (2006.01)
*B32B 7/06* (2019.01)
*A01K 5/01* (2006.01)

(52) U.S. Cl.
CPC .............. *A01K 1/0353* (2013.01); *B32B 3/30* (2013.01); *B32B 7/06* (2013.01); *A01K 5/0135* (2013.01); *B32B 2307/726* (2013.01); *B32B 2307/7265* (2013.01); *B32B 2307/744* (2013.01); *B32B 2471/04* (2013.01)

(58) Field of Classification Search
CPC ........ A01K 1/0353; A01K 1/035; A01K 1/02; A01K 1/033; A01K 1/034; A01K 1/015; B32B 3/30; B32B 7/06
See application file for complete search history.

(56) References Cited

U.S. PATENT DOCUMENTS

| | | | | |
|---|---|---|---|---|
| 5,085,174 | A * | 2/1992 | Etkin | A01K 1/04 119/169 |
| 6,378,456 | B1 * | 4/2002 | Jerome | A01K 1/0353 5/413 R |
| 8,656,863 | B2 * | 2/2014 | Havluciyan | A01K 1/0107 119/165 |
| 9,363,976 | B2 * | 6/2016 | Martin | A01K 1/0107 |
| 10,834,892 | B2 * | 11/2020 | Chen | A01K 1/0157 |
| 11,076,575 | B2 * | 8/2021 | Martin | A01K 1/0107 |
| 2006/0236949 | A1 * | 10/2006 | Hill | A01K 1/0107 119/166 |
| 2008/0236504 | A1 * | 10/2008 | Silverman | A01K 1/0107 119/169 |
| 2018/0077895 | A1 * | 3/2018 | Schulin | A01K 1/0157 |
| 2019/0021277 | A1 * | 1/2019 | Godfrey | A01K 1/0353 |
| 2019/0216047 | A1 * | 7/2019 | Wiegmann | A01K 1/0353 |
| 2020/0146255 | A1 * | 5/2020 | Wendling | A01K 1/0107 |
| 2022/0217938 | A1 * | 7/2022 | Lee | B32B 7/05 |

* cited by examiner

*Primary Examiner* — Trinh T Nguyen
(74) *Attorney, Agent, or Firm* — Birchwood IP (57) ABSTRACT

The present disclosure provides a pet pad and relates to the field of pet supplies. The pet pad includes a water-absorbent layer and a water-repellent layer, the water-absorbent layer being removably connected to the water-repellent layer. The pet pad is provided with a feeding zone and a resting zone separated from each other. The pet pad can be disassembled for cleaning and is cleaner and tidier after being cleaned, so that the growth of bacteria can be reduced.

15 Claims, 12 Drawing Sheets

PET PAD

TECHNICAL FIELD

The present disclosure relates to the field of pet supplies, and in particular to a pet pad.

BACKGROUND ART

With the growth of economy, more and more families choose to keep pets. In the process of keeping pets, the pets will protect their food when eating, and their territorial consciousness is obvious. In addition, the pets also like to eat at designated places, and they like to bring toys and favorite food to carpets or cloths or towels or kennels to enjoy, resulting in a lot of food residues, oil stains, water stains and other contaminations. However, these contaminated items are difficult to clean and prone to bacteria and mildew, and the contaminated items and fungal bacteria may cause skin diseases and some wound infections. Therefore, pet pads have emerged on the market, and these pet pads are specially used when the pets are eating, so as to reduce contamination of other items.

SUMMARY OF THE INVENTION

An embodiment of the present disclosure provides a pet pad, including:
  a water-absorbent layer configured to absorb water generated during pet feeding; a feeding zone and a resting zone being separately formed on the water-absorbent layer, wherein the feeding zone is configured to feed a pet, the resting zone is configured for the pet to have a rest, and the feeding zone and the resting zone are separated by a protrusion.

An embodiment of the present disclosure also provides a pet pad, including:
  a water-absorbent layer configured to absorb water generated during pet feeding; a feeding zone and a resting zone being separately formed on the water-absorbent layer, wherein the feeding zone is configured to feed a pet, and the resting zone is configured for the pet to have a rest; and
  a water-repellent layer removably connected to the water-absorbent layer so as to realize separate cleaning after disassembly.

An embodiment of the present disclosure also provides a pet pad, including:
  a water-absorbent layer configured to absorb water generated during pet feeding; a feeding zone and a resting zone being separately formed on the water-absorbent layer, wherein the feeding zone is configured to feed a pet, and the resting zone is configured for the pet to have a rest; a part of the water-absorbent layer being provided with an at least partially enclosed surrounding edge, and the partially enclosed zone forming the feeding zone; and
  a water-repellent layer removably connected to the water-absorbent layer so as to realize separate cleaning after disassembly.

The foregoing summary is not intended to be restrictive in any way. In addition to the above described aspects, implementations and features, further aspects, implementations and features of the present disclosure will become readily apparent with reference to the accompanying drawings and the following detailed description.

List of reference signs: 1. water-absorbent layer; 2. water-repellent layer; 3. feeding zone; 4. resting zone; 5. non-slip structure; 6. protrusion; 7. surrounding edge.

DETAILED DESCRIPTION OF EMBODIMENTS

Specific embodiments of the present disclosure will be described in detail in this section. Preferred embodiments of the present disclosure are illustrated in the accompanying drawings. The accompanying drawings serve to supplement the text description of the specification with figures, providing a visual understanding of each technical feature and the overall technical solution of the present disclosure, but cannot be construed as a limitation to the scope of protection of the present disclosure.

In the description of the present disclosure, it should be understood that orientation or position relationships indicated by terms "upper", "lower", "front", "rear", "left", "right", etc. are orientation or position relationships as shown in the accompanying drawings, and these terms are just used to facilitate description of the present disclosure and simplify the description, rather than indicating or implying that the mentioned device or element must have a specific orientation and must be constructed and operated in a specific orientation, and thus cannot be construed as a limitation to the present disclosure.

In the description of the present disclosure, "several" means one or more, "a plurality of" means two or more, "greater than", "less than", "over", etc. are construed as excluding the number, and "above", "below", "within", etc. are construed as including the number. The terms "first" and "second" in the description are merely intended to distinguish technical features, and cannot be construed as indicating or implying relative importance or implicitly indicating a number of the indicated technical features or implicitly indicating a sequence relationship of the indicated technical features.

In the description of the present disclosure, unless otherwise explicitly defined, the words such as "arrange", "mount" and "connect" should be understood in a broad sense, and those skilled in the art can reasonably determine the specific meanings of the above words in the present disclosure with reference to the specific contents of the technical solutions.

There are also at least one or more of the following problems in the prior art:
1. an existing pet pad cannot be cleaned thoroughly, may become very dirty after use for a period of time, and thus is prone to the growth of bacteria; 2. the pet pad cannot absorb water, such that water in food may flow out from the pet pad to contaminate the surroundings, which not only damages family environments but also easily causes skin diseases to dogs strained by water in food; 3. the pet pad cannot block food residues and water, such that food residues and water will splash into the surrounding environment and thus are difficult to clean up; 4. the bottom of the pet pad is not non-slip, which makes it easy for the pet pad to shift during use; 5. the upper surface of the pet pad is not non-slip, such that a dog stepping on the pet pad may slip and thus easily gets injured; 7. the pet pad has a single function only for a pet to eat, and lacks a place for the pet to have a rest; 8. water in food cannot be prevented from seepage, such that water in food may penetrate the pet pad and seep into a floor; 9. the pet pad is lack of functional partitioning and thus cannot be modularized in a self-defined manner; 10. the pet pad of an only one-piece design does not allow for partitioned cleaning of partitioned modules; 11. the single-layer thick structure makes it difficult to clean thoroughly; and 12. the pet pad is short in service life, easy to be scratched by the pet, and susceptible to corrosion by food residues and water.

Figure 1:
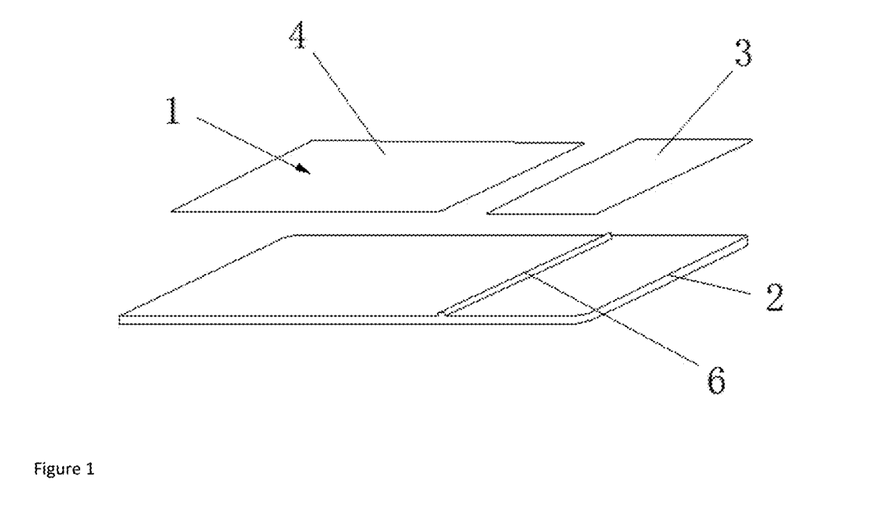
FIG. 1 is a schematic structural diagram of a pet pad according to an embodiment of the present disclosure.
Figure 2:
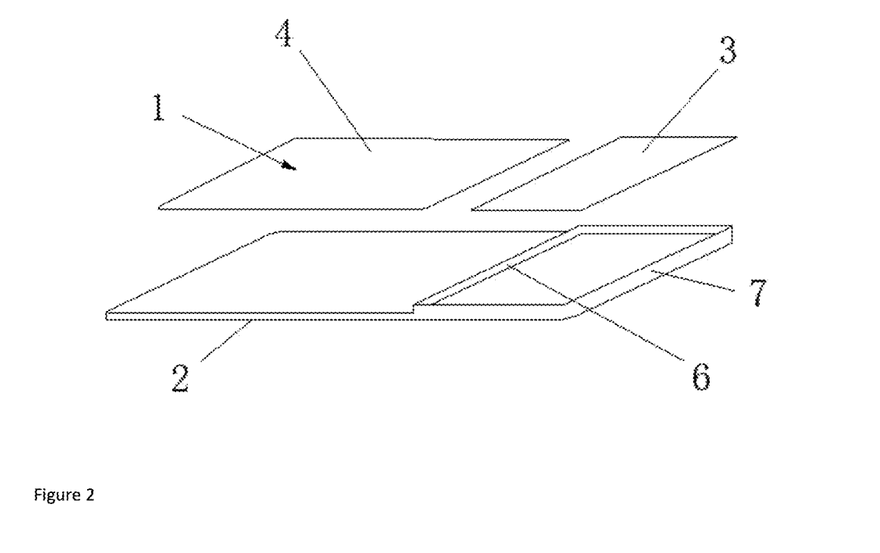
FIG. 2 is a schematic structural diagram of a pet pad according to another embodiment of the present disclosure.

In order to solve at least one of the above problems, referring to FIG. 1, as a preferred embodiment of the present disclosure, a pet pad includes a water-absorbent layer 1 and a water-repellent layer 2, wherein the water-repellent layer 2 is located under the water-absorbent layer 1, and the water-absorbent layer 1 is removably connected to the water-repellent layer 2. The pet pad is provided with a feeding zone 3 and a resting zone 4 separated from each other.

In an embodiment of the present disclosure, a removable connecting structure between the water-absorbent layer 1 and the water-repellent layer 2 is not defined, and may be set according to actual needs. For example, the removable connecting structure may be a magnetic attracting structure, or the removable connecting structure may be a hook-and-loop fastener bonding structure, or the removable connecting structure may be a snap-on structure, or the removable connecting structure may be a nested structure, or the removable connecting structure may be other suitable structures, which is not limited thereto.

In an embodiment of the present disclosure, the specific manufacturing material of neither the water-absorbent layer 1 nor the water-repellent layer 2 is defined, and both of them can be set according to actual needs.

In an embodiment of the present disclosure, the pet pad is provided with the water-absorbent layer 1 and the water-repellent layer 2, and the water-absorbent layer 1 and the water-repellent layer 2 can be separately detached for cleaning, so that the interior of the pet pad can be cleaned thoroughly, making the pet pad cleaner and tidier and reducing the growth of bacteria. In an embodiment of the present disclosure, the pet pad is provided with the water-absorbent layer 1, and the water-absorbent layer 1 can absorb saliva that comes out when the pet is eating, water that splashes out when the pet is drinking, and water in the food residues, thereby preventing water from flowing out of the pet pad to the ambient environment. In an embodiment of the present disclosure, the pet pad is provided with the water-repellent layer 2, such that water can be prevented from penetrating the pet pad and thus contaminating the floor. Moreover, in an embodiment of the present disclosure, the pet pad is provided with the feeding zone 3 and the resting zone 4 separated from each other, such that functional partitioning of the pet pad is realized. The feeding zone 3 is specially configured to feed a pet, and the resting zone 4 is specially configured for the pet to have a rest, which provides a place for the pet to have a rest, and also separates the feeding zone 3 from the resting zone 4 such that contamination of the resting zone 4 by food residues and water can be reduced.

Figure 7:
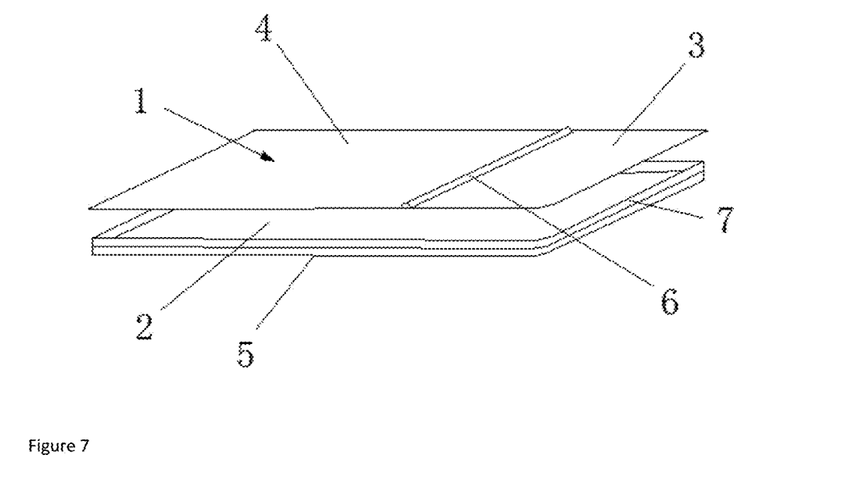
FIG. 7 is a schematic structural diagram of a pet pad according to another embodiment of the present disclosure.
Figure 8:
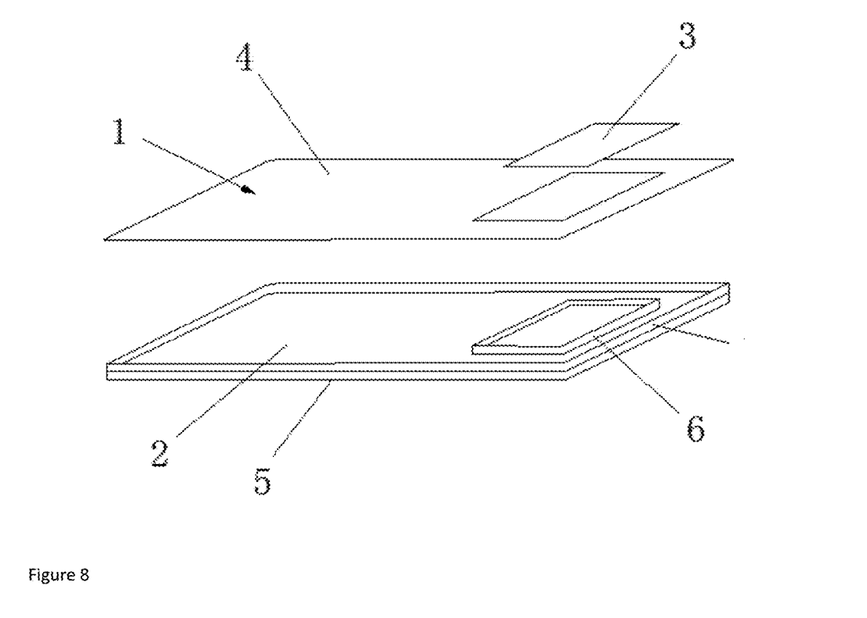
FIG. 8 is a schematic structural diagram of a pet pad according to another embodiment of the present disclosure.

Referring to FIGS. 7 and 8, in an implementation, a non-slip structure 5 is provided at the bottom of the water-repellent layer 2, so that the anti-slip effect of the pet pad is improved. In the process of using the pet pad by the pet, the incidence of shifting of the pet pad can be reduced, achieving a better using effect. In other implementations, the bottom of the water-repellent layer 2 may not be provided with a non-slip structure 5. In other implementations, the bottom of the water-repellent layer 2 may not be provided with a non-slip structure 5, and the material of the bottom of the non-slip layer 2 has an anti-slip effect.

In an implementation, the non-slip structure 5 is removably provided at the bottom of the water-repellent layer 2, so that the non-slip structure 5 can be detached for separate cleaning when the pet pad needs to be cleaned, which achieves a better cleaning effect and can reduce the growth of bacteria. In other implementations, the non-slip structure 5 may be non-removably provided at the bottom of the water-repellent layer 2.

Referring to FIG. 1, in an implementation, the water-absorbent layer 1 is provided with a protrusion 6 to separate the feeding zone 3 from the resting zone 4, so that the protrusion 6 can prevent food residues and water in the feeding zone 3 from entering the resting zone 4, thus ensuring the cleanliness and the tidiness of the resting zone 4, reducing the growth of bacteria and being healthier for the pet to have a rest. In other implementations, other suitable structures may be used to separate the feeding zone 3 from the resting zone 4.

Referring to FIGS. 1 to 4, in an implementation, the water-repellent layer 2 is provided with a protrusion 6, and the protrusion 6 runs through the water-absorbent layer 1 to separate the feeding zone 3 from the resting zone 4. In this way, the protrusion 6 can prevent food residues and water in the feeding zone 3 from entering the resting zone 4, thereby ensuring the cleanliness and the tidiness of the resting zone 4, reducing the growth of bacteria and being healthier for the pet to have a rest. In other implementations, other suitable structures may be used to separate the feeding zone 3 from the resting zone 4.

Figure 6:
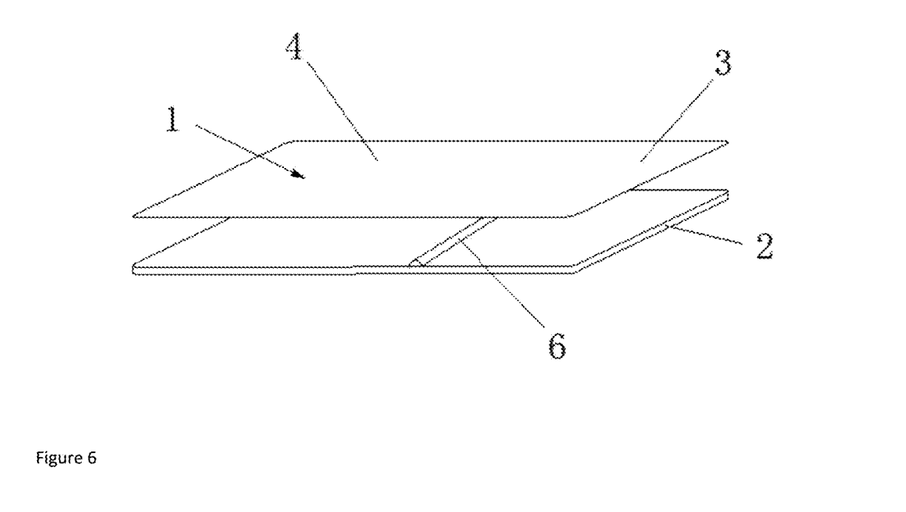
FIG. 6 is a schematic structural diagram of a pet pad according to another embodiment of the present disclosure.

Referring to FIG. 6, in an implementation, the water-repellent layer 2 is provided with a protrusion 6, and the protrusion 6 props up a corresponding portion of the water-absorbent layer 1 to separate the feeding zone 3 from the resting zone 4. In this way, the protrusion 6 can prevent food residues and water in the feeding zone 3 from entering the resting zone 4, thereby ensuring the cleanliness and the tidiness of the resting zone 4, reducing the growth of bacteria and being healthier for the pet to have a rest. In other implementations, other suitable structures may be used to separate the feeding zone 3 from the resting zone 4.

Figure 5:
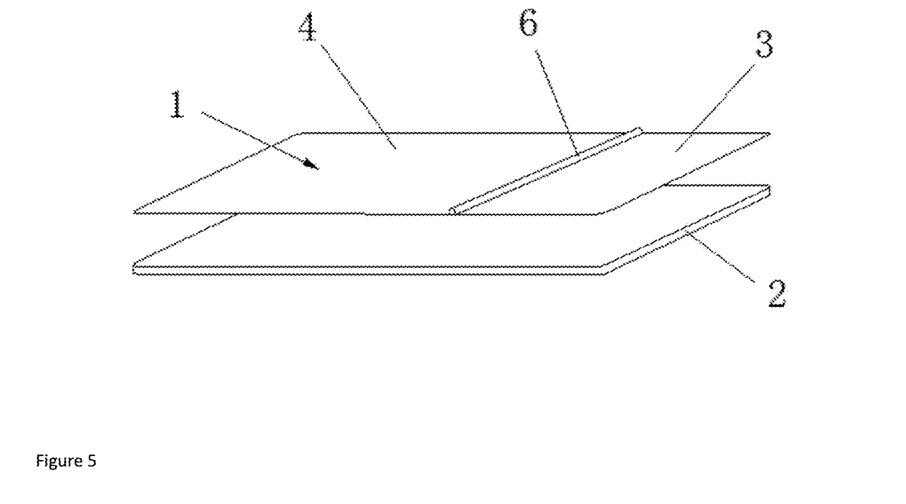
FIG. 5 is a schematic structural diagram of a pet pad according to another embodiment of the present disclosure.

Referring to FIG. 5, in an implementation, two ends of the protrusion 6 extend to two side edges of the water-absorbent layer 1, a zone of the water-absorbent layer 1 at one side of the protrusion 6 is the feeding zone 3, and a zone at the other side is the resting zone 4. In this way, the protrusion 6 can effectively prevent food residues and water in the feeding zone 3 from entering the resting zone 4. In addition, the protrusion 6 is simple in structure and thus easier to make. Referring to FIG. 1, in other implementations, a raised line may be provided on the water-repellent layer 2, two ends of the protrusion 6 extend to two side edges of the water-repellent layer 2, and the protrusion 6 runs through the water-absorbent layer 1 to separate the feeding zone 3 from the resting zone 4. Referring to FIG. 6, in other implementations, a raised line may be provided on the water-repellent layer 2, two ends of the protrusion 6 extend to two side edges of the water-repellent layer 2, and the protrusion 6 props up a corresponding portion of the water-absorbent layer 1 to separate the feeding zone 3 from the resting zone 4. In other implementations, the protrusion 6 may be provided in other suitable structures.

Figure 4:
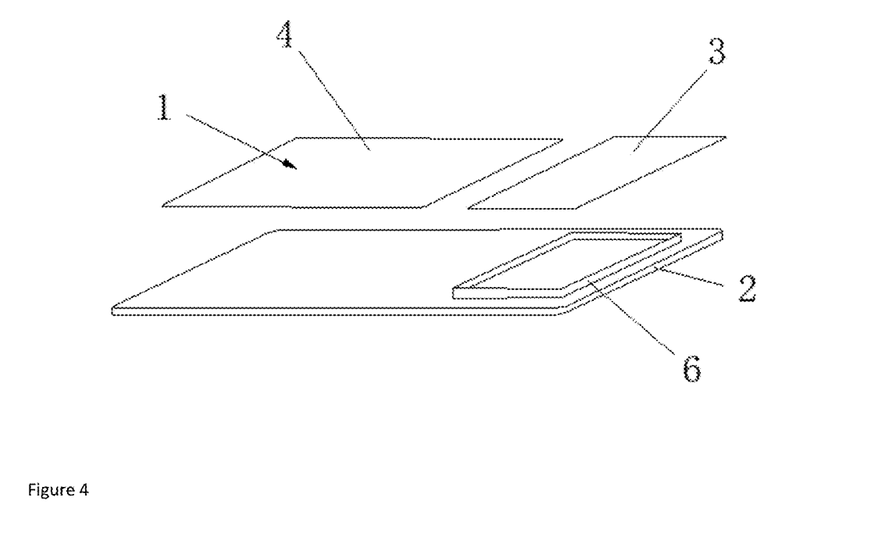
FIG. 4 is a schematic structural diagram of a pet pad according to another embodiment of the present disclosure.

In an implementation, the protrusion 6 encloses the feeding zone 3 on the water-absorbent layer 1, and a remaining zone on the water-absorbent layer 1 other than the protrusion 6 is the resting zone 4. In this way, the protrusion 6 can effectively prevent food residues and water in the feeding zone 3 from entering the resting zone 4. In addition, the protrusion 6 is simple in structure and thus easier to make. In other implementations, a raised line may be provided on the water-repellent layer 2, the protrusion 6 encloses a space on the water-repellent layer 2, the protrusion 6 runs through the water-absorbent layer 1 to separate the feeding zone 3 from the resting zone 4, a portion of the water-absorbent layer 1 located inside an internal space of the protrusion 6 is the feeding zone 3, and a portion of the water-absorbent layer 1 located outside the internal space of the protrusion 6 is the resting zone 4. Referring to FIGS. 4 and 8, in other implementations, a raised line may be provided on the water-repellent layer 2, the protrusion 6 encloses a space on the water-repellent layer 2, the protrusion 6 props up a corresponding portion of the water-absorbent layer 1 to separate the feeding zone 3 from the resting zone 4, a portion of the water-absorbent layer 1 located inside the internal space of the protrusion 6 is the feeding zone 3, and a portion of the water-absorbent layer 1 located outside the internal space of the protrusion 6 is the resting zone 4. In other implementations, the protrusion 6 may be provided in other suitable structures.

Figure 3:
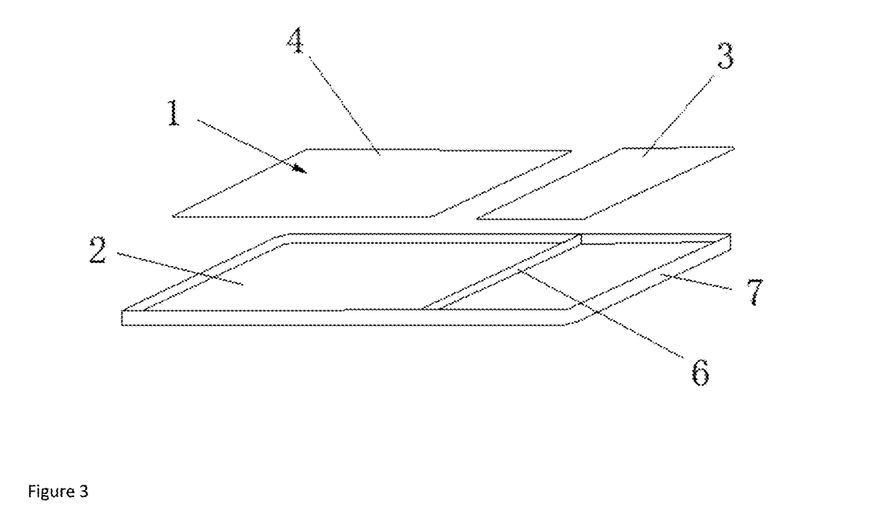
FIG. 3 is a schematic structural diagram of a pet pad according to another embodiment of the present disclosure.

Referring to FIG. 3, in an implementation, an edge of the water-repellent layer 2 is provided with a surrounding edge 7 protruding upward, and the surrounding edge 7 surrounds at least a part of an edge of the water-absorbent layer 1 and protrudes upward from the water-absorbent layer 1. For example, the surrounding edge 7 may surround all the edges of the water-absorbent layer 1 and protrude upward from the water-absorbent layer 1, or the surrounding edge 7 may surround only the edge of the water-absorbent layer 1 corresponding to the feeding zone 3 and protrude upward from the water-absorbent layer 1, or the surrounding edge 7 may also be provided with other suitable structures, which is not limited thereto. With the above structure, by providing the surrounding edge 7, food residues and water can be prevented from splashing into the surrounding environment, thus making the environment around the pet pad cleaner and tidier. In other implementations, the surrounding edge 7 may be directly provided on the water-absorbent layer 1. In other implementations, neither the water-repellent layer 2 nor the water-absorbent layer 1 may be provided with the surrounding edge 7.

Figure 9:
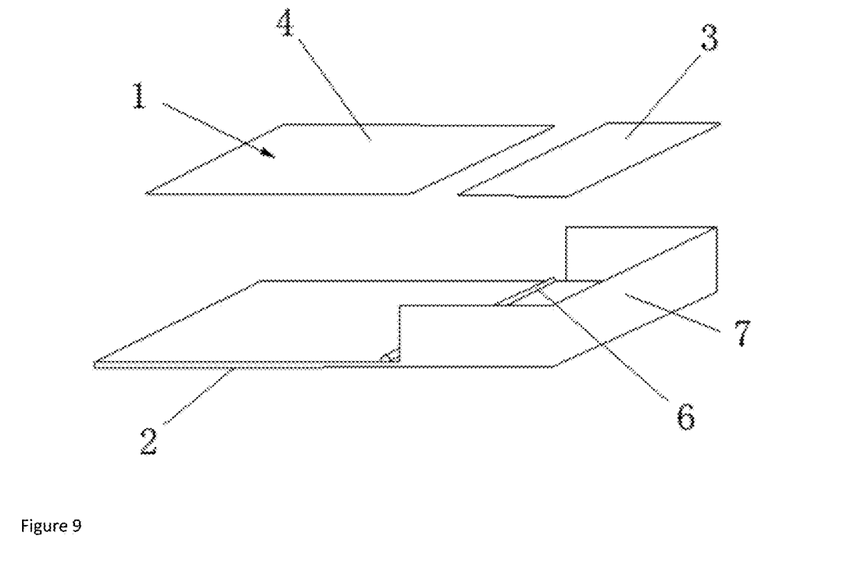
FIG. 9 is a schematic structural diagram of a pet pad according to another embodiment of the present disclosure.
Figure 10:
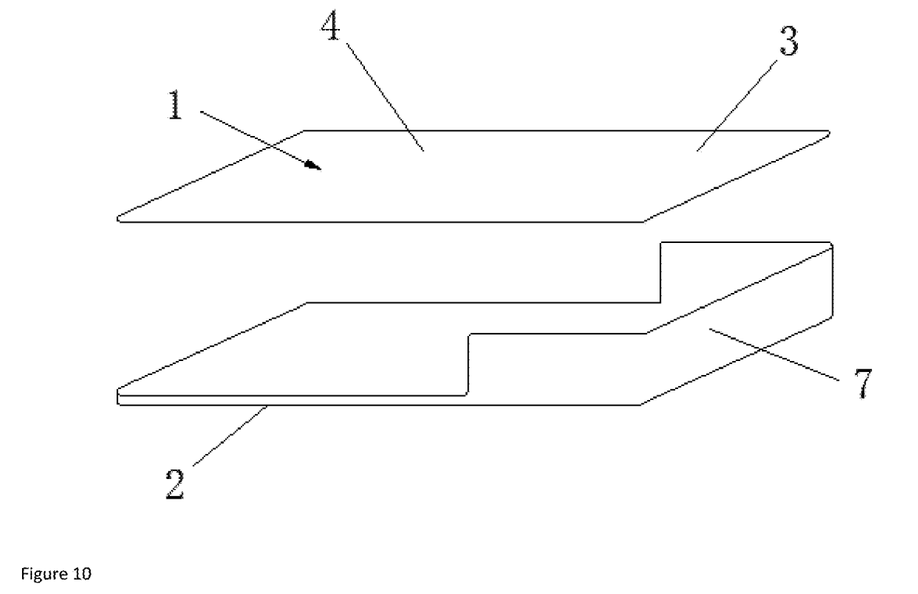
FIG. 10 is a schematic structural diagram of a pet pad according to another embodiment of the present disclosure.

Referring to FIGS. 9 and 10, the height of the surrounding edge can be increased according to actual needs, so that food residues and water can be more effectively prevented from splashing into the surrounding environment, thus making the environment around the pet pad cleaner and tidier.

Figure 11:
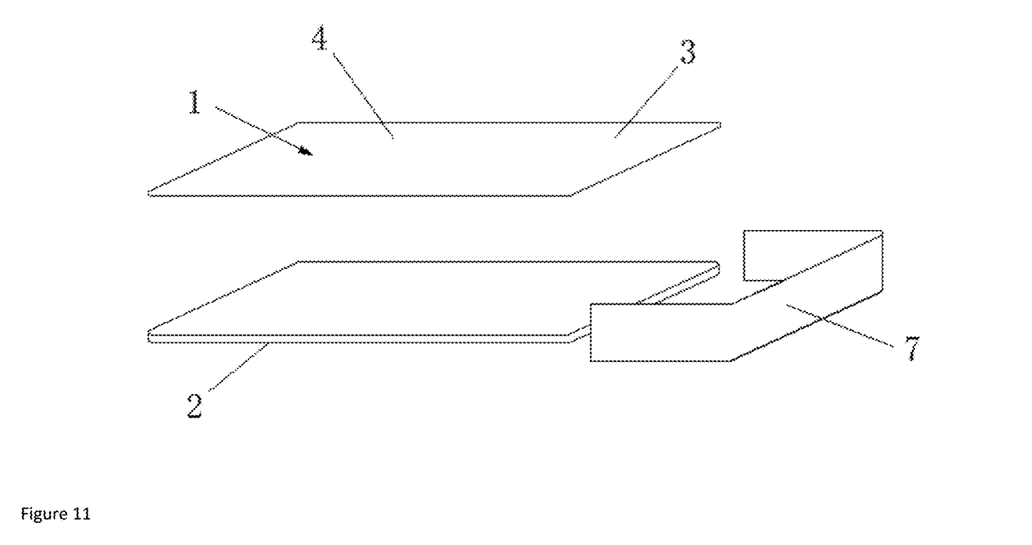
FIG. 11 is a schematic structural diagram of a pet pad according to another embodiment of the present disclosure.

Referring to FIG. 11, in an implementation, the surrounding edge 7 is removably provided on the water-repellent layer 2, so that when the pet pad needs to be cleaned, the surrounding edge 7 can be detached, and then the water-repellent layer 2 and the surrounding edge 7 are cleaned separately, which can prevent accumulation of food residues and water at corners and thus makes the cleaning cleaner.

Figure 12:
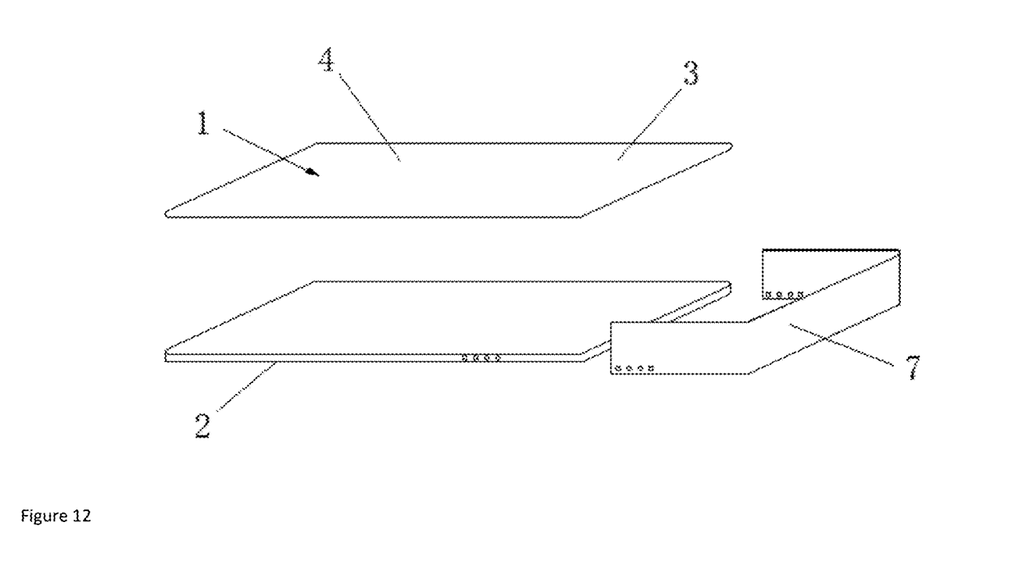
FIG. 12 is a schematic structural diagram of a pet pad according to another embodiment of the present disclosure.
Figure 13:
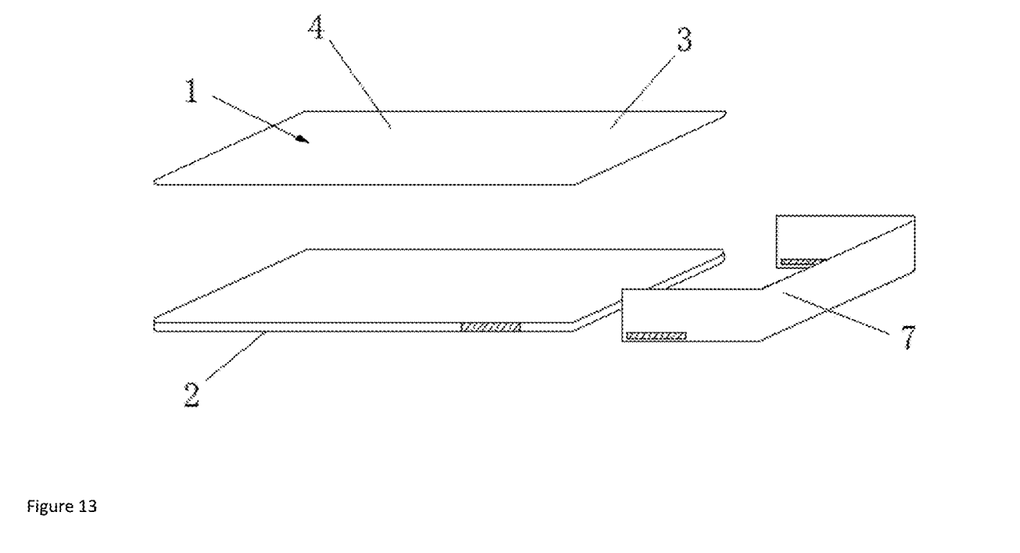
FIG. 13 is a schematic structural diagram of a pet pad according to another embodiment of the present disclosure.
Figure 14:
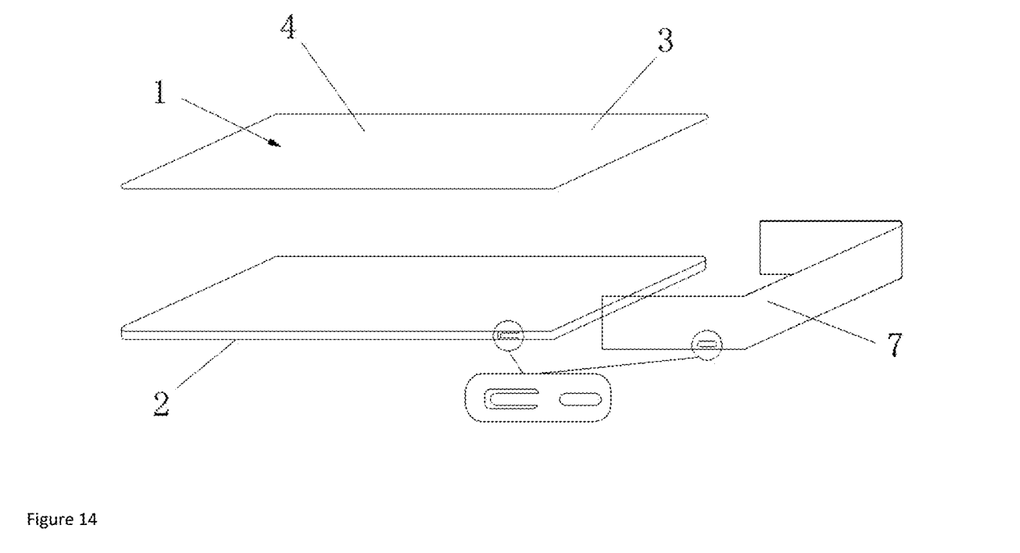
FIG. 14 is a schematic structural diagram of a pet pad according to another embodiment of the present disclosure.
Figure 15:
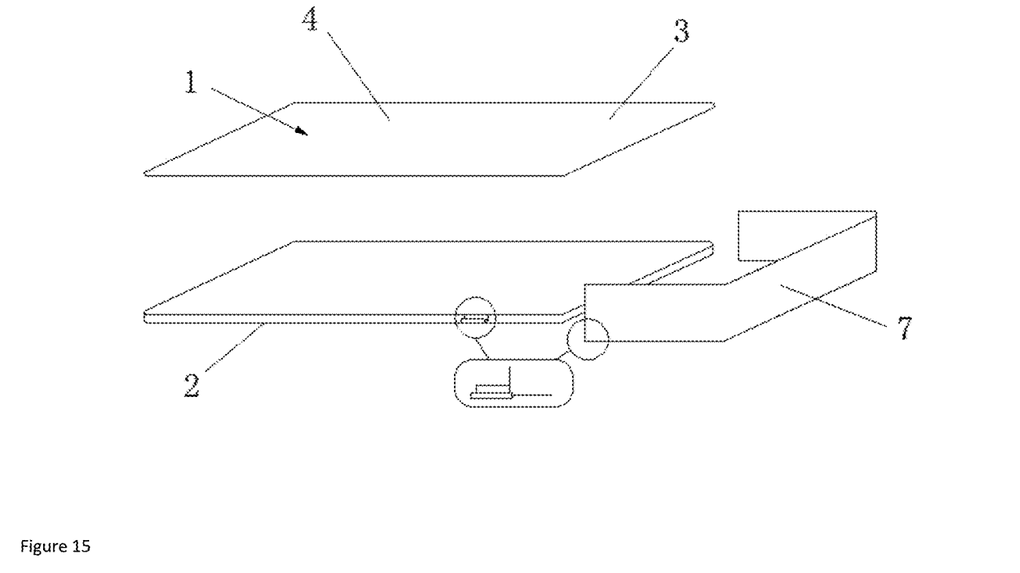
FIG. 15 is a schematic structural diagram of a pet pad according to another embodiment of the present disclosure.
Figure 16:
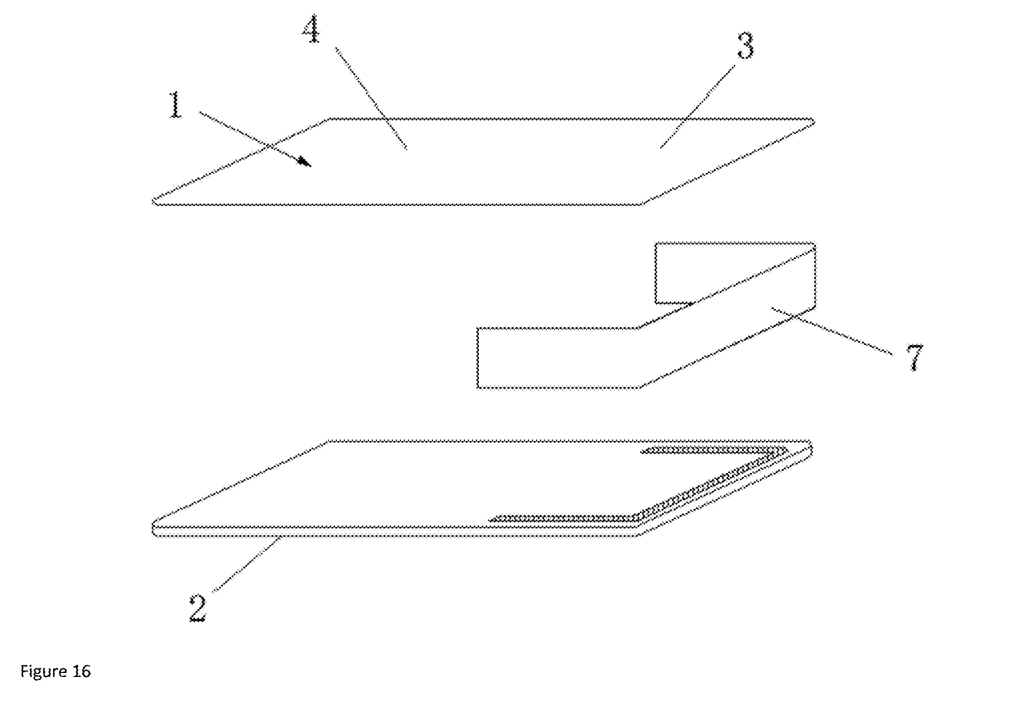
FIG. 16 is a schematic structural diagram of a pet pad according to another embodiment of the present disclosure.

In an embodiment of the present disclosure, the specific removable connecting structure between the surrounding edge 7 and the water-repellent layer 2 is not defined, and can be set according to actual needs. Referring to FIG. 12, in an implementation, the surrounding edge 7 and the water-repellent layer 2 are connected by means of a magnetic attracting structure. Referring to FIG. 13, in other implementations, the surrounding edge 7 and the water-repellent layer 2 may be connected by means of a hook-and-loop fastener structure. Referring to FIGS. 14 and 15, in other implementations, the surrounding edge 7 and the water-repellent layer 2 may be connected by means of a snap-on structure, the specific structure of which is not defined and can be set according to actual needs. Referring to FIG. 16, in other implementations, the surrounding edge 7 and the water-repellent layer 2 may be connected by means of a plug-in structure.

Figure 17:
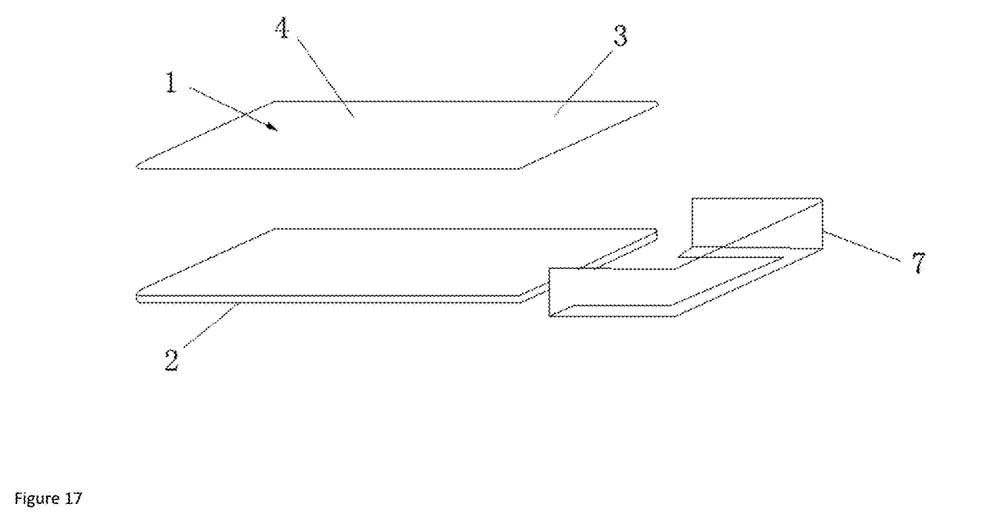
FIG. 17 is a schematic structural diagram of a pet pad according to another embodiment of the present disclosure.
Figure 18:
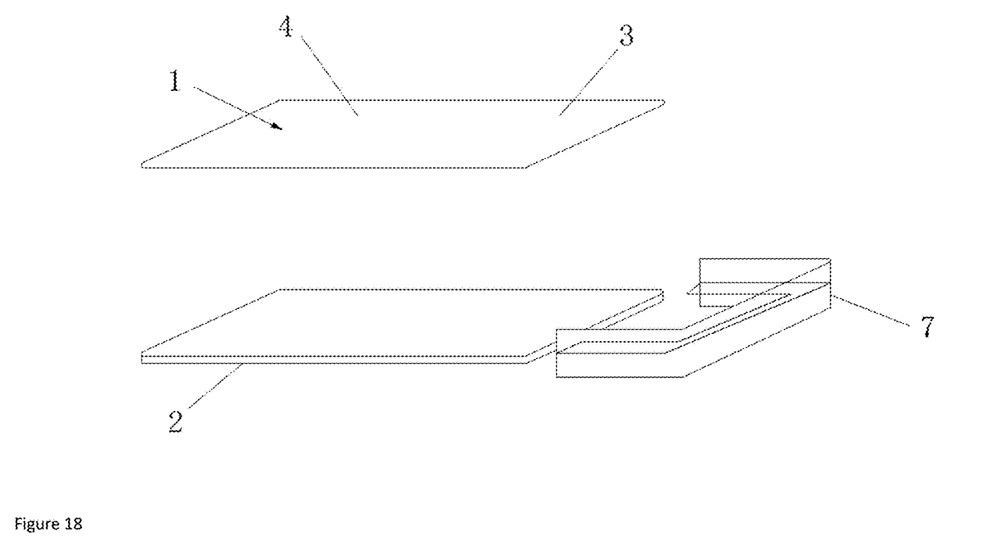
FIG. 18 is a schematic structural diagram of a pet pad according to another embodiment of the present disclosure.

Referring to FIG. 11, in an implementation, the pet pad may include a surrounding edge 7, the surrounding edge 7 and the water-repellent layer 2 may be provided separately, and the surrounding edge 7 may directly lean against the edge of the water-repellent layer 2. Referring to FIG. 17, in other implementations, the pet pad may include a surrounding edge 7, the surrounding edge 7 and the water-repellent layer 2 may be provided separately, an extension may be provided on the inner side of the bottom of the surrounding edge 7, and the bottom of the water-repellent layer 2 may press the extension after the surrounding edge 7 leans against the edge of the water-repellent layer 2. Referring to FIG. 18, in other implementations, the pet pad may include a surrounding edge 7, the surrounding edge 7 and the water-repellent layer 2 may be provided separately, an extension may be provided on the inner side of the middle of the surrounding edge 7, and the water-absorbent layer 1 and the water-repellent layer 2 may clamp the extension after the surrounding edge 7 leans against the edge of the water-repellent layer 2.

Figure 19:
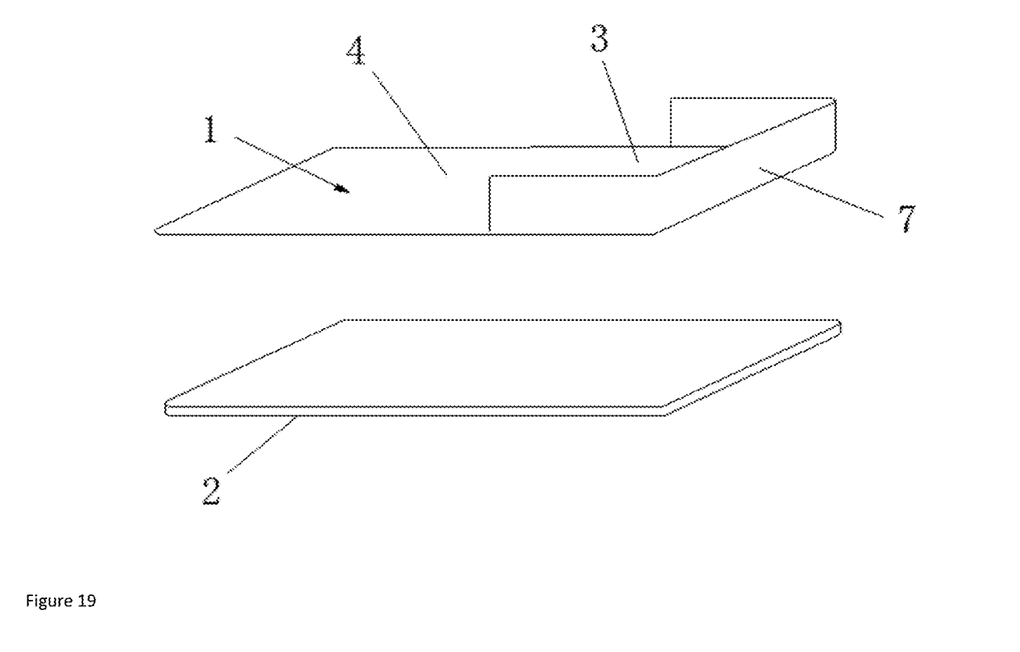
FIG. 19 is a schematic structural diagram of a pet pad according to another embodiment of the present disclosure.

Referring to FIG. 19, in an implementation, the edge of the water-absorbent layer 1 may be provided with a surrounding edge 7 protruding upward.

Referring to FIG. 1, in an implementation, a portion of the water-absorbent layer 1 corresponding to the feeding zone 3 and a portion of the water-absorbent layer 1 corresponding to the resting zone 4 are two mutually independent portions, so that in the process of cleaning the pet pad, the portion of the water-absorbent layer 1 corresponding to the feeding zone 3 and the portion of the water-absorbent layer 1 corresponding to the resting zone 4 can be cleaned separately, thus achieving a better cleaning effect. Referring to FIG. 6, in other implementations, the portion of the water-absorbent layer 1 corresponding to the feeding zone 3 and the portion of the water-absorbent layer 1 corresponding to the resting zone 4 are of an interconnected structure.

In an implementation, the protrusion 6 is made of a waterproof material, so that water in the feeding zone 3 can be more effectively prevented from entering the resting zone 4, making the resting zone 4 cleaner and tidier. In an implementation, the protrusion 6 is made of a water-absorbent material. In other implementations, the protrusion 6 may be made of other suitable materials.

In an implementation, the surface of the protrusion 6 is curved, such that when the pet touches the protrusion 6 in the process of using the pet pad, the protrusion 6 with the curved surface can reduce the discomfort of the pet and thus is more favorable for the pet to use. In other implementations, the surface of the protrusion 6 may be in other suitable shapes.

In an implementation, the protrusion 6 is removable, so that when the pet pad needs to be cleaned, the protrusion 6 can also be removed for cleaning, reducing accumulation of food residues and water at the corners and in gaps of the protrusion 6 of the pet pad and making the pet pad cleaner and tidier and more hygienic. In other implementations, the protrusion 6 may be non-removable.

In an implementation, the water-absorbent layer 1 is made of a washable soft non-slip fabric, so that the incidence of slippage of the pet on the pet pad and the incidence of injuries to the pet are reduced, and the comfort of the pet having a rest on the pet pad can also be improved. In other implementations, the water-absorbent layer 1 may be made of other suitable materials.

Figure 20:
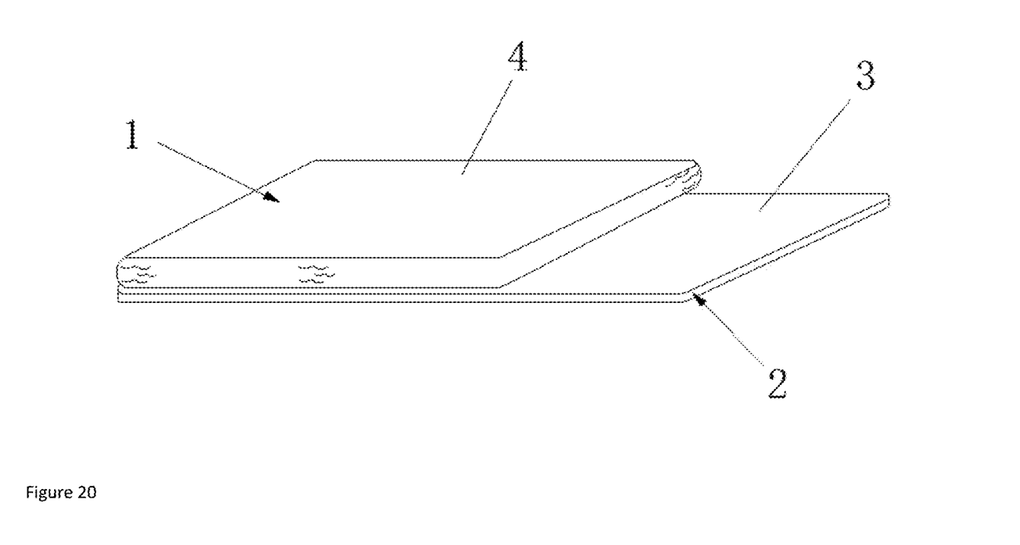
FIG. 20 is a schematic diagram of a structural combination of a pet pad according to another embodiment of the present disclosure.
Figure 21:
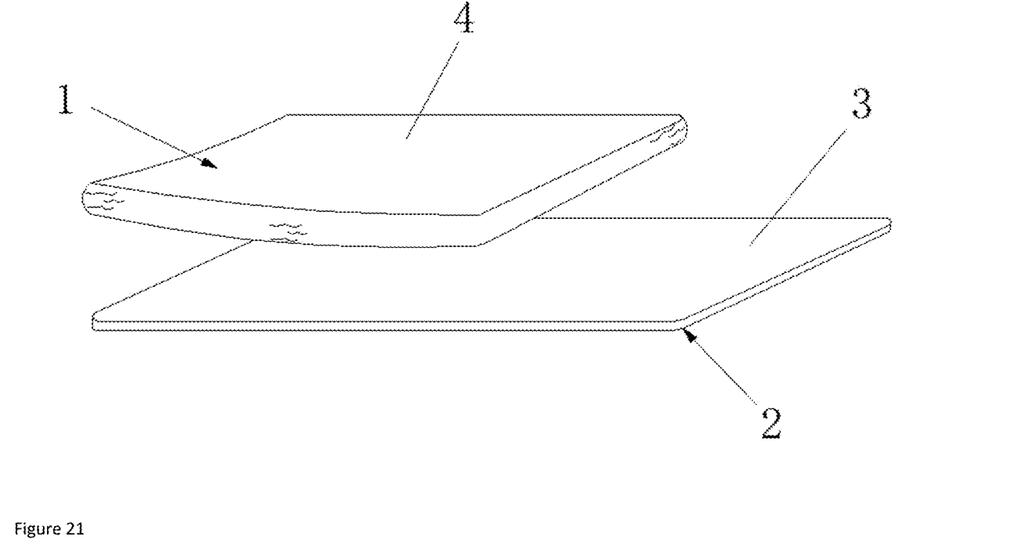
FIG. 21 is a schematic exploded diagram of the structure of a pet pad according to another embodiment of the present disclosure.
Figure 22:
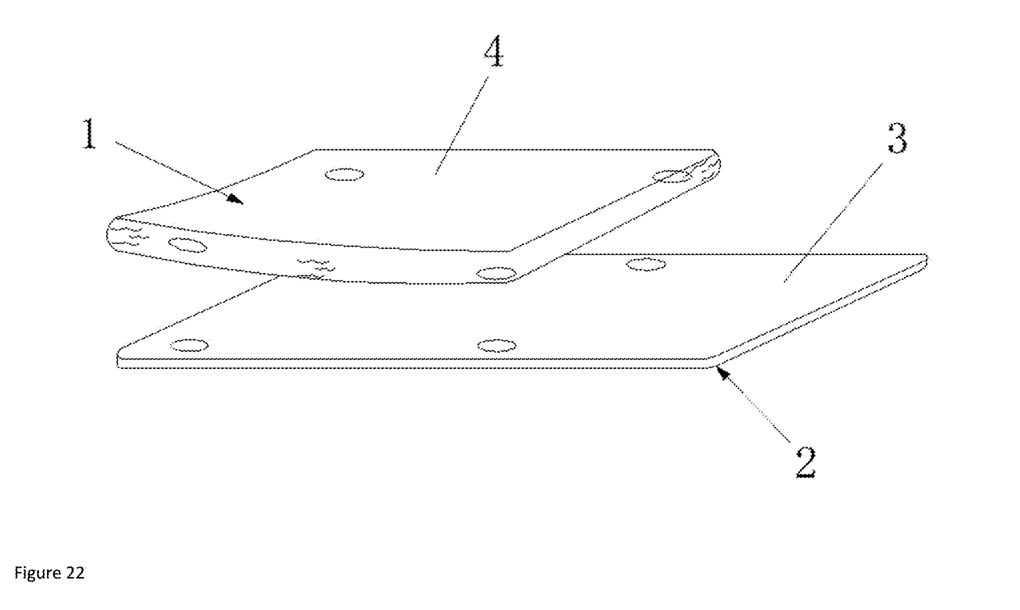
FIG. 22 is a schematic structural diagram of a pet pad according to another embodiment of the present disclosure.
Figure 23:
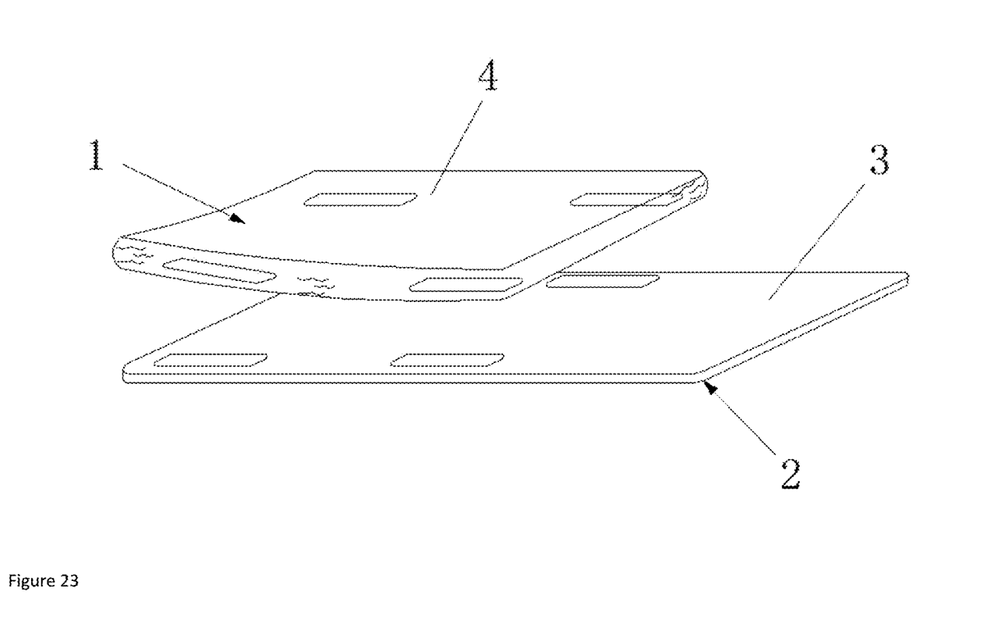
FIG. 23 is a schematic structural diagram of a pet pad according to another embodiment of the present disclosure.

Referring to FIGS. 19 and 20, in an implementation, the area of the water-absorbent layer 1 is less than the area of the water-repellent layer 2, the water-absorbent layer 1 is provided with the resting zone 4, and a portion of the water-repellent layer 2 protruding from the water-absorbent layer 1 is the feeding zone 3. In this way, by providing the water-absorbent layer 1 and the water-repellent layer 2 having different areas to separate the resting zone 4 from the feeding zone 3, the contamination of the resting zone 4 by food residues and water can be reduced. The removable connecting structure between the water-absorbent layer 1 and the water-repellent layer 2 is not defined. Exemplarily, referring to FIG. 22, the water-absorbent layer 1 and the water-repellent layer 2 may be connected by means of a magnetic attracting structure, and referring to FIG. 23, the water-absorbent layer 1 and the water-repellent layer 2 may be connected by means of a hook-and-loop fastener, or the water-absorbent layer 1 and the water-repellent layer 2 may be connected by means of other suitable removable connecting structures, which is not limited thereto. In other implementations, other suitable structures may be used to separate the feeding zone 3 from the resting zone 4. Those skilled in the art can freely combine and use the above additional technical features provided that no conflict occurs.

The foregoing implementations are only preferred implementations of the present disclosure and cannot be used to limit the scope of protection of the present disclosure. All non-essential modifications and substitutions made by those skilled in the art on the basis of the present disclosure shall fall within the scope of protection of the present disclosure.

The invention claimed is:

1. Pet pad, comprising:
a water-absorbent layer configured to absorb water generated during pet feeding; a feeding zone and a resting zone being separately formed on the water-absorbent layer, wherein the feeding zone is configured to feed a pet, the resting zone is configured for the pet to have a rest,
a water-repellent layer, the water-repellent layer and the water-absorbent layer are detachably connected to facilitate separate cleaning after disassembly;
the water-repellent layer is provided with a protrusion, and the protrusion runs through the water-absorbent layer to separate the feeding zone from the resting zone, or, the protrusion props up a corresponding portion of the water-absorbent layer to separate the feeding zone from the resting zone.

2. He pet pad according to claim 1, wherein a non-slip structure is provided at a bottom of the water-repellent layer.

3. He pet pad according to claim 1, wherein a portion of the water-absorbent layer corresponding to the feeding zone and a portion of the water-absorbent layer corresponding to the resting zone are two mutually independent portions.

4. He pet pad according to claim 1, wherein a portion of the water-absorbent layer corresponding to the feeding zone and a portion of the water-absorbent layer corresponding to the resting zone are integral.

5. He pet pad according to claim 1, wherein the protrusion is made of a waterproof material.

6. He pet pad according to claim 1, wherein the protrusion is made of a water-absorbent material.

7. He pet pad according to claim 1, wherein a surface section of the protrusion is curved.

8. He pet pad according to claim 1, wherein the protrusion is removably provided.

9. Pet pad, comprising:
a water-absorbent layer configured to absorb water generated during pet feeding; a feeding zone and a resting zone being separately formed on the water-absorbent layer, wherein the feeding zone is configured to feed a pet, and the resting zone is configured for the pet to have a rest; and
a water-repellent layer removably connected to the water-absorbent layer so as to realize separate cleaning after disassembly, a surrounding edge is provided on the edge of the water-repellent layer, which surrounds a part of the water-repellent layer to form the feeding zone;
the water-repellent layer is provided with a protrusion, and the protrusion runs through the water-absorbent layer to separate the feeding zone from the resting zone, or, the protrusion props up a corresponding portion of the water-absorbent layer to separate the feeding zone from the resting zone.

10. He pet pad according to claim 9, wherein a portion of the water-absorbent layer corresponding to the feeding zone and a portion of the water-absorbent layer corresponding to the resting zone are two mutually independent portions.

11. He pet pad according to claim 9, wherein the surrounding edge is integrated with the water-repellent layer.

12. He pet pad according to claim 9, wherein the surrounding edge is removably connected to the water-repellent layer.

13. Pet pad, comprising a feeding zone and a resting zone, wherein the feeding zone is configured to feed a pet, and the resting zone is configured for the pet to have a rest; and a part of the pet pad is provided with an at least partially enclosed surrounding edge, and the partially enclosed surrounding edge forms the feeding zone; the pet pad comprises a water-absorbent layer and a water-repellent layer, the feeding zone and the resting zone being provided on the water-absorbent layer; the water-repellent layer is provided with a protrusion, and the protrusion runs through the water-absorbent layer to separate the feeding zone from the resting zone, or, the protrusion props up a corresponding portion of the water-absorbent layer to separate the feeding zone from the resting zone.

14. He pet pad according to claim 13, wherein the surrounding edge is removably connected to or integrated with the water-repellent layer.

15. The pet pad according to claim 13, wherein the water-absorbent layer is configured to absorb water generated during pet feeding; and the water-repellent layer is removably connected to the water-absorbent layer so as to realize separate cleaning after disassembly.

* * * * *